UNITED STATES PATENT OFFICE.

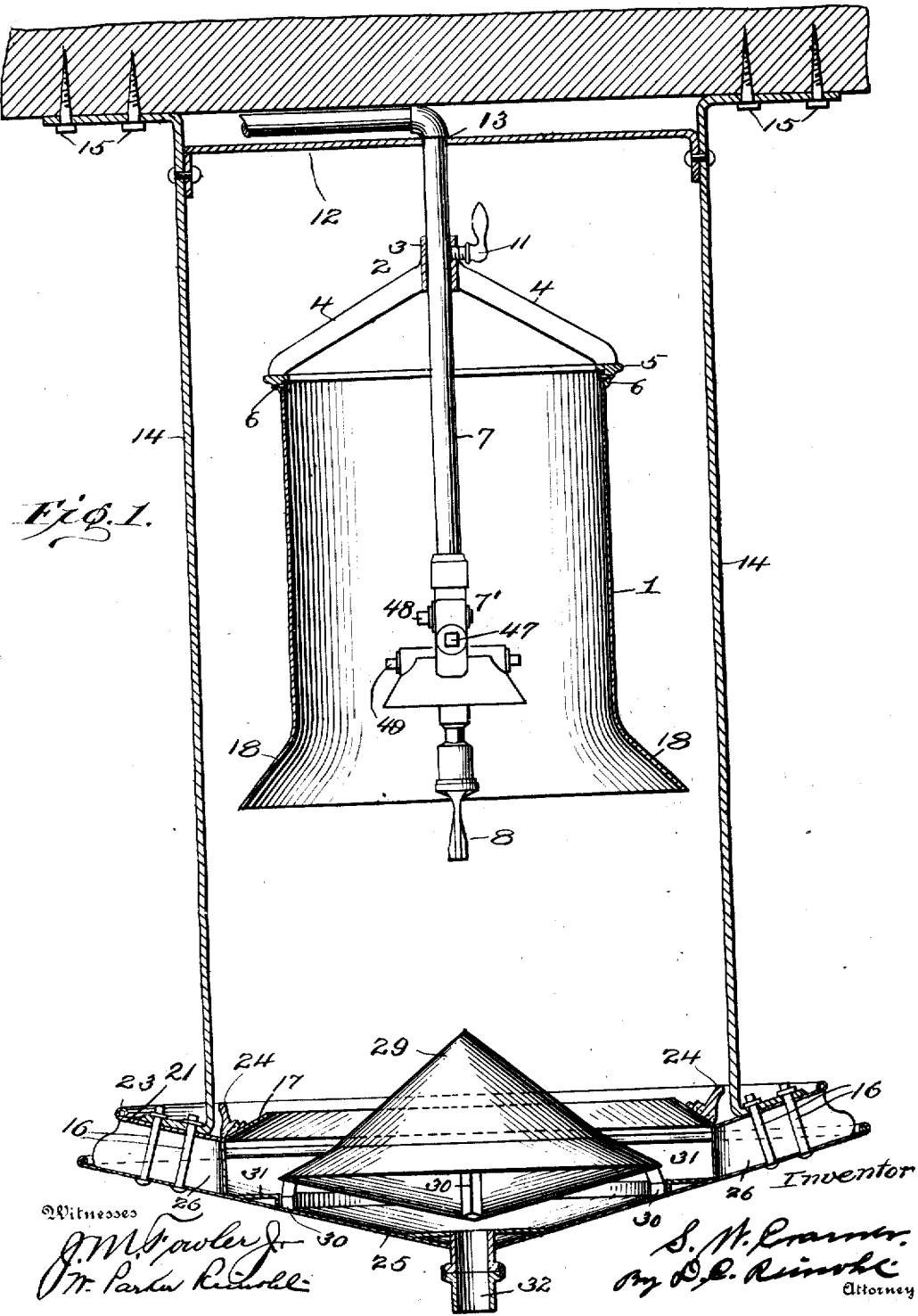

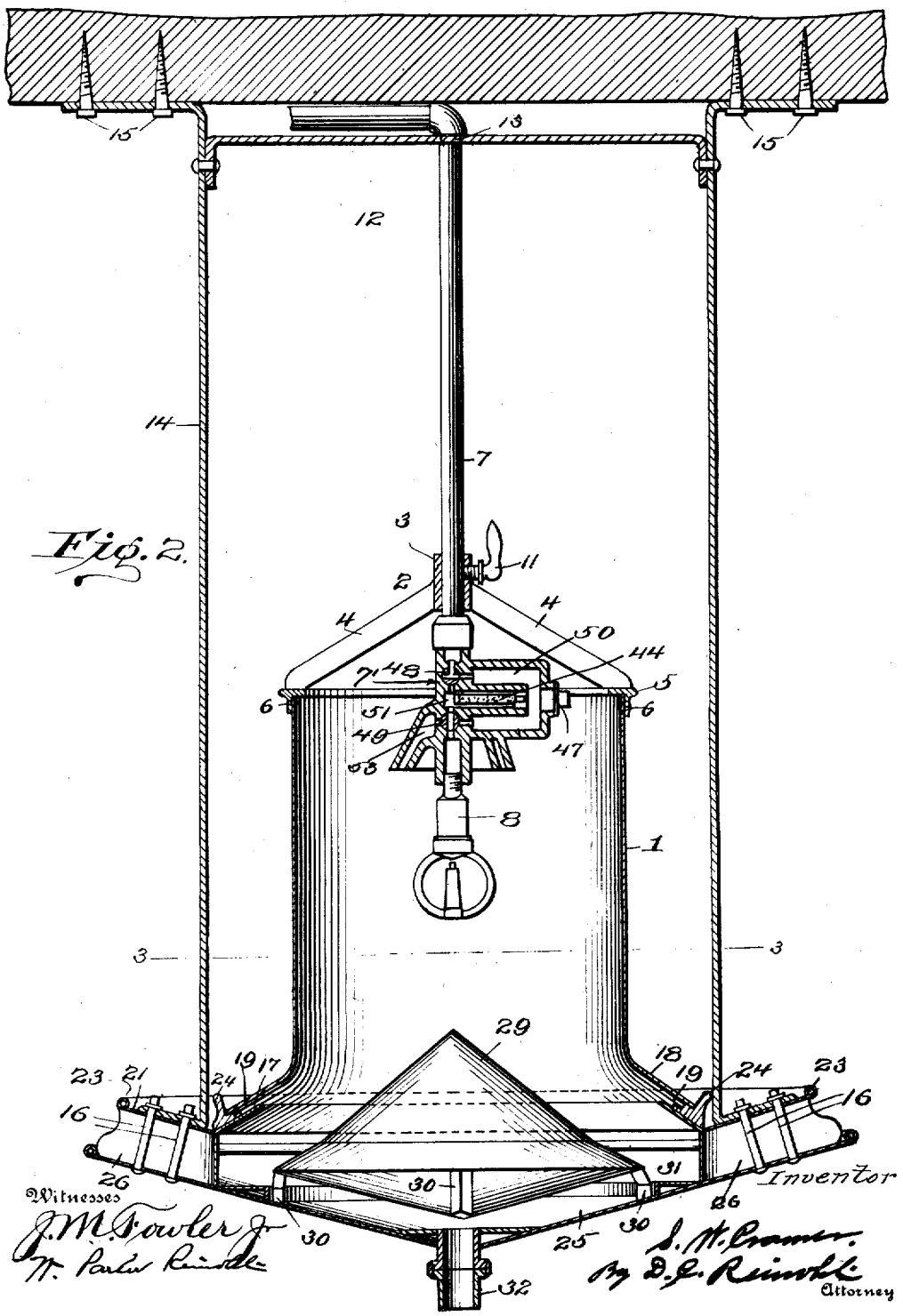

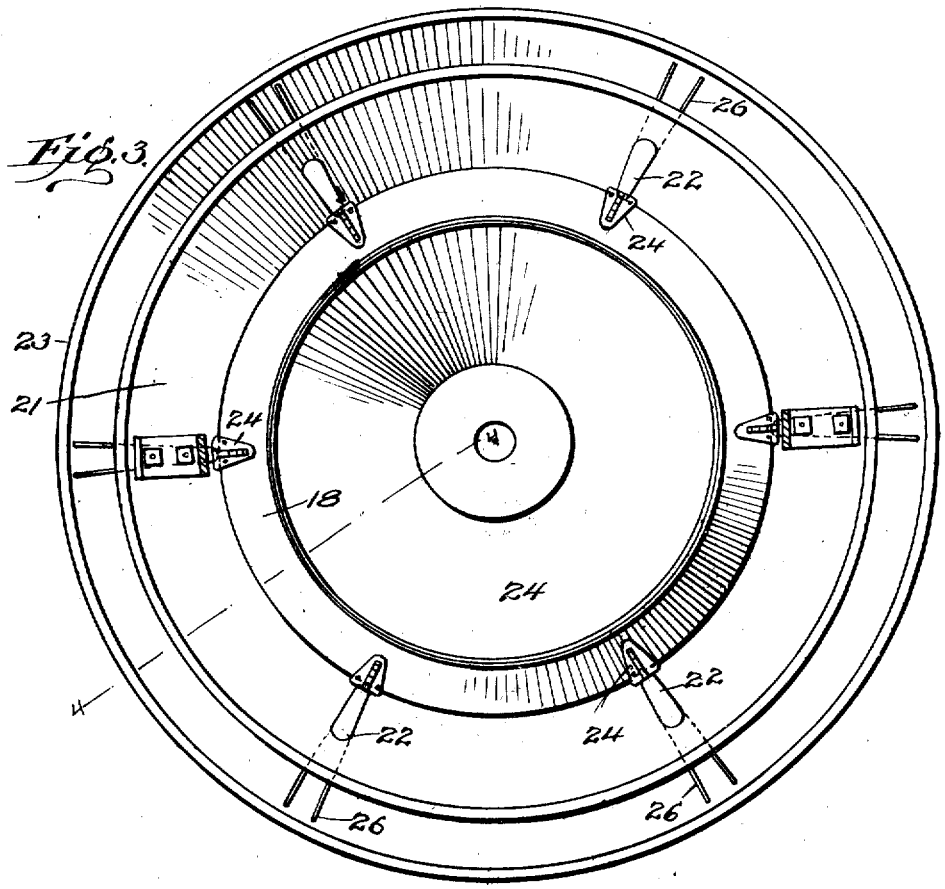
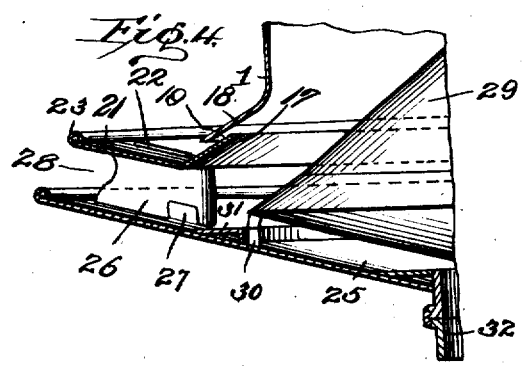
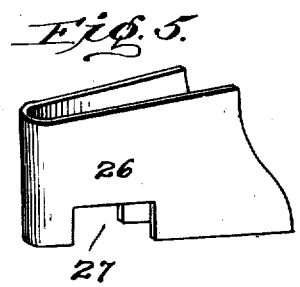

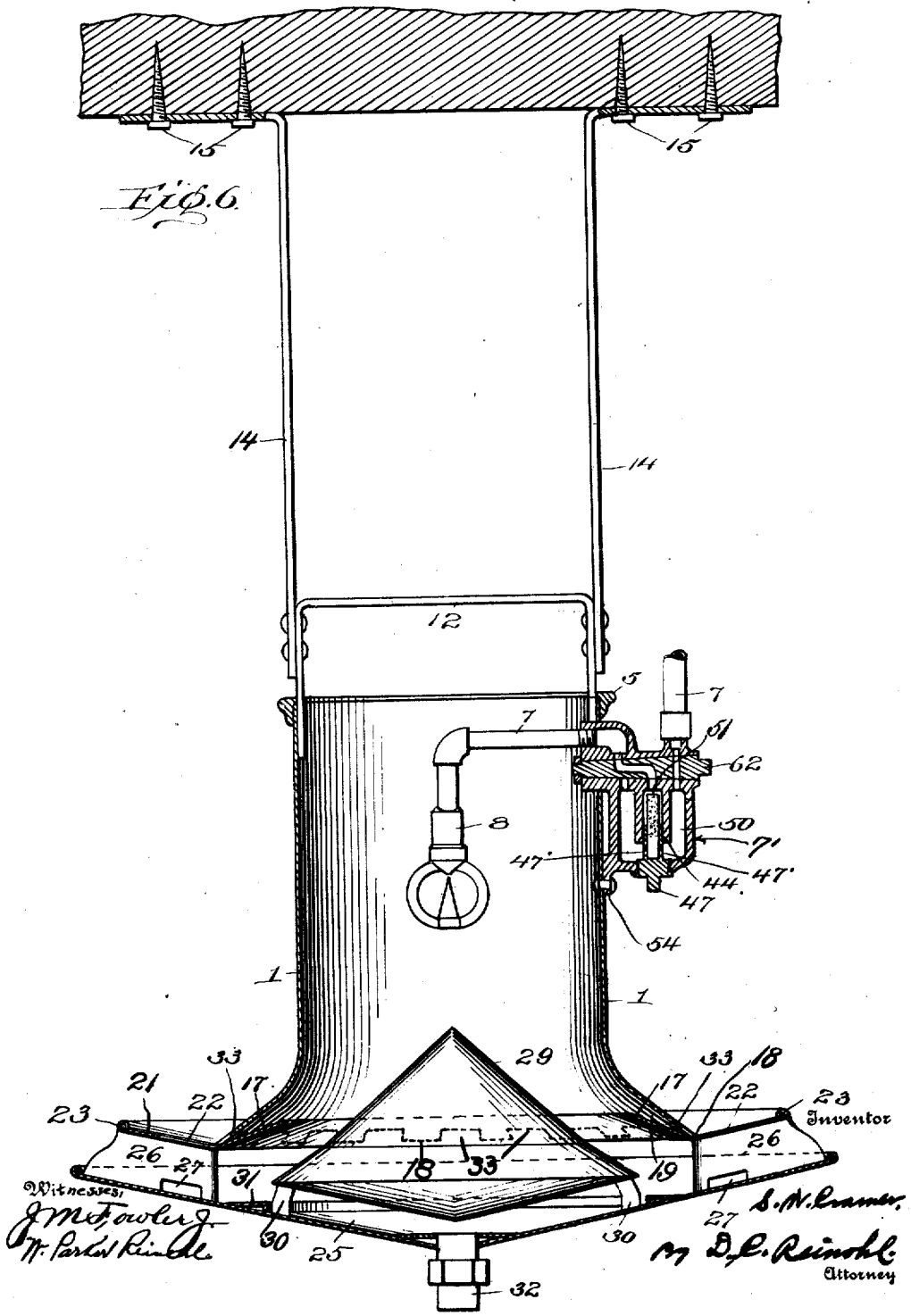

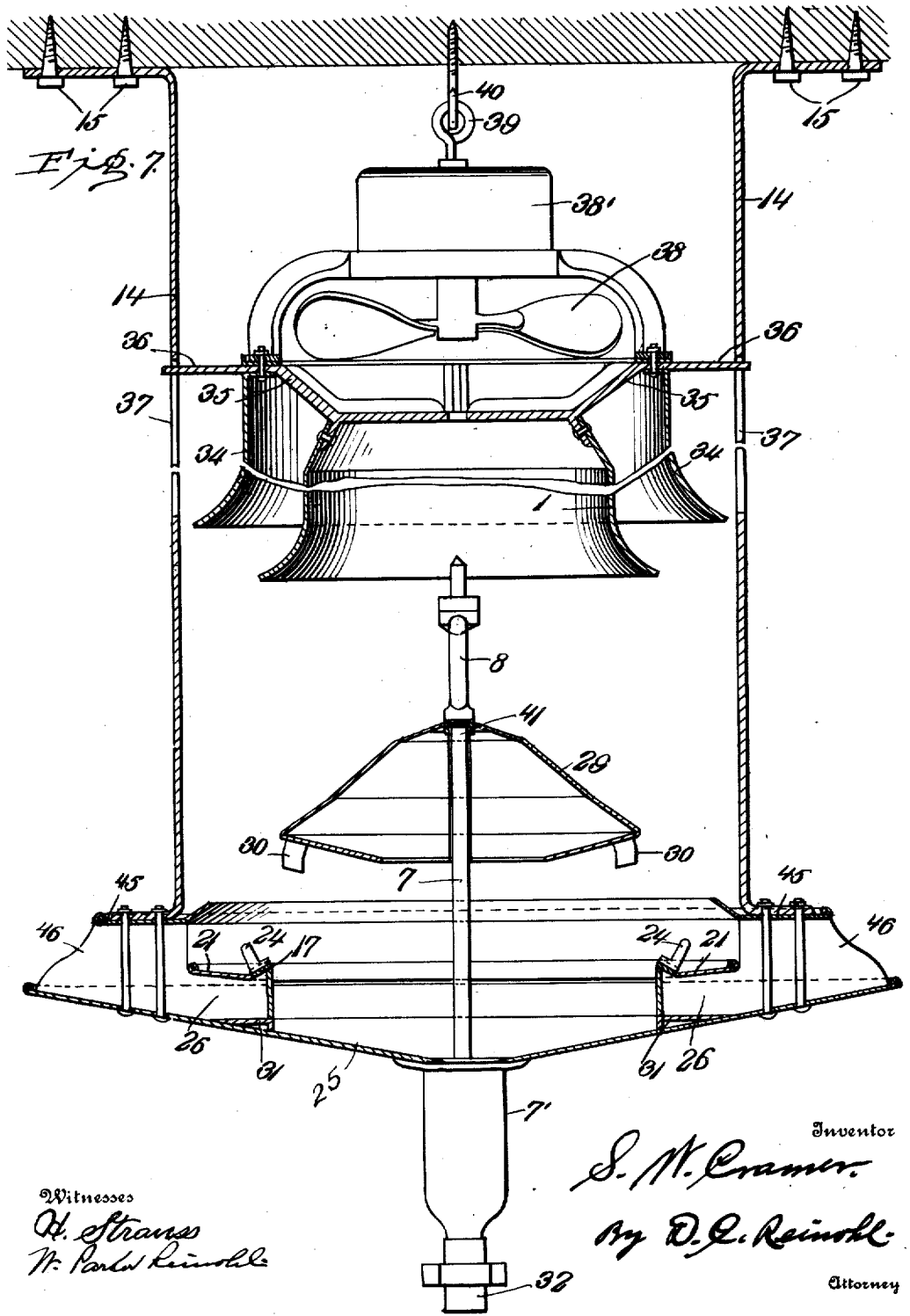

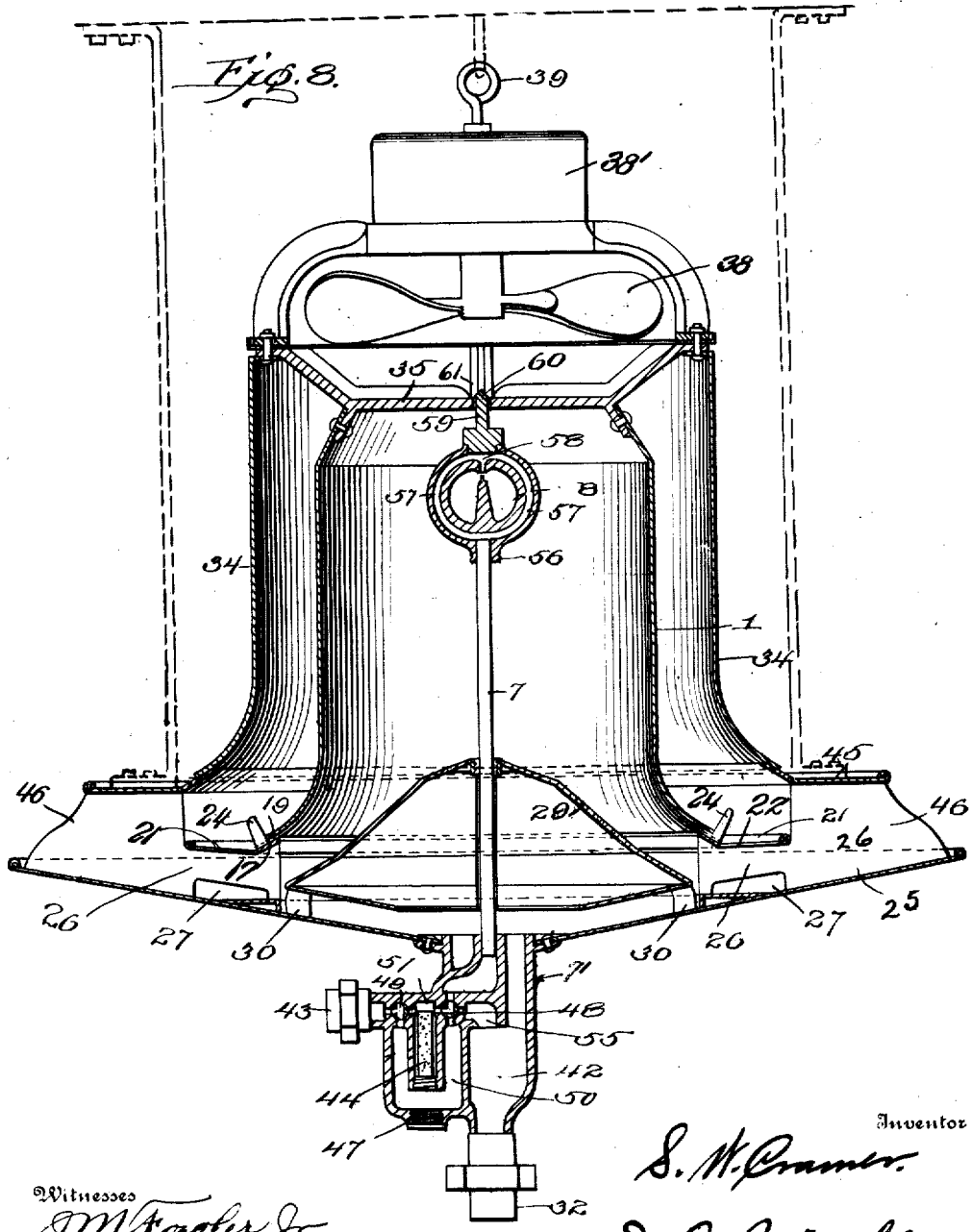

STUART W. CRAMER, OF CHARLOTTE, NORTH CAROLINA.

HUMIDIFIER AND AIR-MOISTENING APPARATUS.

No. 908,962.        Specification of Letters Patent.        Patented Jan. 5, 1909.

Application filed November 29, 1907. Serial No. 404,389.

*To all whom it may concern:*

Be it known that I, STUART W. CRAMER, a citizen of the United States, residing at Charlotte, in the county of Mecklenburg and State of North Carolina, have invented certain new and useful Improvements in Humidifiers and Air-Moistening Apparatus; and I do hereby declare the following to be a full, clear, and exact description of the invention, such as will enable others skilled in the art to which it appertains to make and use the same.

My invention relates to means for moistening the air in a room or factory, has for its object to provide an apparatus which will keep the air constantly supplied with any preferred amount of moisture and diffuse such moisture throughout the room, and the invention consists in certain improvements in construction, which will be fully disclosed in the following specification and claims.

In the operation or practical use of humidifiers, the spray is delivered from the spray nozzle or head in a cone like body of sufficient density and velocity to draw a current of air through the casing of the humidifier. The mixed air and spray passing through the casing attains considerable velocity and issues radially from the casing. The atmosphere of textile factories is frequently heavily charged with lint, "fly" and other impurities which enter the humidifier with the current of air, and these impurities vigorously doused with the water comprising the spray have heretofore been collected with the surplus water and returned through the waste pipes to the water tank of the circulating system, from which the water is used over and over again.

It is my purpose to arrest and collect these impurities and prevent them from being returned to the water tank, and also to provide ready means for cleansing the humidifier whenever found necessary.

The desirability of greater accessibility being incorporated in the construction of humidifiers is shown by the fact that attempts have already been made along this line. This fact was recognized in my former patents #778,172, #792,402 and #798,880. I wish to discriminate however, in the use of the vertically movable casing as contemplated at present and that which I formerly showed in the patents referred to. Spray types of humidifiers are essentially of two kinds, those discharging upward and those discharging downward, which may be termed up-draft and down-draft respectively. The up-draft is applicable only for spray produced on an atomizer principle by both air and water; there is not sufficient water going through heads where the spray is atomized to make either the "drip" a material factor or the removal of the lint and "fly" collected because comparatively little of it is washed from the atmosphere. The down-draft type of humidifier is the one generally used where hydraulic spraying is resorted to for producing the spray; in this type of apparatus the amount of water is of such consequence that the "drip" must be taken care of, and that part of the lint and "fly" that collects on the inside of the apparatus must also be capable of being removed. And so, that whereas in my former patents for up-draft types of humidifiers the casings were made removable to provide accessibility for easily reaching the mechanical parts within, the vertically movable feature that I am now applying to down-draft types of humidifiers is practically exclusively one to facilitate cleaning. Again, fixed to the casing of my up-draft type of humidifiers was the deflecting cone and the flared edge adjacent to the deflecting cone, all of which was removable together, therefore by considering the one type of humidifier as being the other one inverted, the removable feature included in my former patents becomes one of lifting downward and away the lower part from the upper part of a down-draft type of humidifier.

I am also aware that attempts have been made to facilitate cleansing in down-draft types of humidifiers by making separable and vertically movable the lower flared edge of the casing. That this did not answer the requirements is evident because this construction is not now used. The trouble is the wrong part was made adjustable, and as heretofore constructed sufficient accessibility was not gained to warrant the adoption of the plan proposed. It is believed, however, that by making the lower flared portion of the casing separate and independent of the casing, and by attaching said flared portion to the lower part of the humidifier comprising the collecting basin, and by supporting the casing from either the basin itself or said upper flared portion attached to the basin, thereby leaving the cylindrical part of the casing free and disconnected so that it may be vertically movable will do away with the undesirable features connected with constructions heretofore proposed, and render the apparatus so entirely accessible and so durable and workmanlike in construction as to warrant the extra expense incurred in attaining that end.
My improvements in construction facilitating inside cleaning, also provide for greater convenience in cleaning the strainer. Spray types of humidifiers are generally installed on a circulating system, whereby the surplus water is collected from each humidifier and returned to the storage tank, where it is partly filtered and pumped again through the supply pipes and through the heads, usually passing through a separate small strainer attached to each humidifier. It is obvious that this is necessary because nothing short of a very complete filtering of the water, which owing to its inconvenience and cost would be extremely undesirable, would get rid of all the impurities washed from the atmosphere and collected in the surplus return water;, the pumping of this water through the supply pipes without straining would cause the small holes of the nozzles to speedily clog up. And so, small strainers attached to each humidifier are a necessity. On the best forms of these strainers, the perforated surface is made large enough so that they can be run for quite a long time without requiring any attention. After a while, however, practically all of the holes become clogged and the strainers must be removed and blown out to be cleaned. Among my improvements of construction to facilitate cleaning, it is obvious that of cleaning the strainers is one of the most important. By the simple process of reversing the flow of the water through the strainer by the necessary plug cock connections, the pores of the strainers can be blown clear in a moment and without even removing them from their receptacles. The wash water from the strainers can be disposed of either directly through the same pipe by unscrewing the nozzle, or in its preferred form it can be turned out through a separate opening either directly into the waste water outlet of the humidifier or in a cone shaped sheet of water, thereby washing down the sides and inner parts of the whole humidifier with a large flow of water under high pressure.

In the accompanying drawings, which form part of this specification:—Figure 1 represents a vertical section of my improved humidifier with the casing raised or elevated from its normal position for the purpose of removing impurities. Fig. 2 a like view, showing the casing in its normal position. Fig. 3 a horizontal section on line 3, 3, Fig. 2 with the casing and the deflector removed. Fig. 4 a detail sectional view on line 4, 4, Fig. 3, Fig. 5 a detail perspective of one of the spacing pieces or water conductors. Fig. 6 a vertical section showing a modified form of construction. Fig. 7 shows a vertical section partly in elevation of another type of humidifier wherein the features comprising the present invention are applied to my inner and outer casing type of humidifier with fan draft, and Fig. 8 a like view taken at a right angle to Fig. 7, with the casings, fan, and deflecting cone in their normal position for operation.

Reference being had to the drawings and the designating characters thereon, the numeral 1, indicates the casing of the humidifier which rests normally on the waste water receptacle or basin, and is vertically adjustable so that it can be raised out of the way of the receptacle and its appurtenances to provide ready access to the humidifier for the purpose of cleansing it or removing adhering impurities therefrom.

2 indicates a centering and supporting spider secured to the casing and provided with a hub 3, and radial arms 4 attached to a ring 5, to the inside of which the casing is attached by suitable means, such as screws or rivets 6.

7 is the water supply pipe at the end of which and within the casing 1 is a sprayhead 8, and the supply pipe is provided with a fitting 7', provided with stop cocks 48 and 49.

The casing is vertically adjustable on the supply pipe 7, and is secured in elevated position by a set screw 11 in the hub 3 of the spider.

12 indicates a stirrup, provided with an opening 13 through which the supply-pipe 7 passes, and properly centers the sprayhead in the casing. The stirrup is secured at each end to the supporting straps 14, 14 on which the humidifier is suspended, the straps being secured to the ceiling of the room or to an overhead beam by screws 15, or other suitable means. The lower ends of the straps 14, 14 are bent to the proper angle and secured to the water receptacles or basins by bolts or rivets 16.

The water receptacle comprises an upper annular basin or member, below and adjacent to the lower or discharge end of the casing, and is provided with an inwardly extending and upwardly projecting flange 17 set at an angle coincident with the angle of the flaring bell-shaped terminal 18 of the casing to provide an annular air passage 19, and the flange forms a barrier to water deflected by the cone or deflector 29 passing laterally out of the casing between the lower end thereof and part 25 of said basin. The basin is also provided with an angular or outwardly inclined flange 21 which extends beyond the casing, and forms an arrester for accumulating lint, "fly" or other impurities which flow down the inside of the wall of the casing and are blown or forced out through the annular opening or passage 19, and lodge on the flange, from which they may be readily removed when necessary. The flange 21 is provided with a series of openings 22 through which the water passes down into the lower basin, and at the perimeter of the flange is an annular upturned bead or projection 23, primarily for stiffening the flange and at the same time prevents water and the collected lint and the like, being washed out over the extremities of the flange.

On the flange 17 are lugs 24 on which the lower end of the casing rests and by which the casing is held in proper relation to the remaining parts of the humidifier. The lugs also break up or interrupt the continuity of the passage 19.

25 indicates the lower basin or receptacle for collecting all the waste water of the humidifier and which is permanently connected to the upper basin by the bolts or rivets 16, and between the flange 21, and the basin 25 are spacing members 26, and which form conductors for the water which flows through the openings 22, and is discharged into the basin 25 through openings 27 in the walls of said members. The inner end of the spacing members is closed to prevent the blowing out of the humidifier of the heavy drops or bodies of water which flow down from the upper basin into the lower basin.

28 indicates the annular discharge opening for the major portion of the saturated air from the humidifier.

It will be observed that the air which is discharged through the annular passage 19, encounters the drip from the inside of the wall of the casing, and is saturated thereby, but the fall of the water from the end of the casing, or the distance between the end of the casing and the upper basin is so small, and the flange 21 proportionately so wide and inclined upwardly that no drops of water are blown out into the room over the flange.

29 indicates the cone or deflector, and consists of two cones with their bases adjacent to each other and joined together, so that the water which flows down the upper cone is directed toward the center of the basin 25, by the lower cone and is discharged into the water in the basin, so that it cannot be picked up by the air in its passage between the basins and carried out of the humidifier. It is obvious that the lower cone need not extend to its apex, but that if a portion thereof were removed the water would still be conducted inwardly toward the center of the basin. The deflector is detached from the basin 25, and rests upon lugs or supports 30, which engage the bottom of the basin, and the deflector is held against lateral displacement by an annular projection or step 31.

The casing being raised on the pipe 7, the deflector may be readily removed, when the basins and their accessories may be readily cleaned and all collected impurities removed therefrom.

32 is a waste pipe for returning water to the supply tank, not shown, to be used over and over again in the humidifiers.

In Fig. 6 the casing 1 with the flared edge 18 is down upon and firmly affixed to the upper annular basin, but the same result is partly accomplished by providing openings 33 circumferentially around the lower part of the flared edge 18 whereby the water collecting between the surfaces 17 and 18 can be discharged laterally outward, and where the lint and "fly" can settle before the water runs down through the openings 22 and out through 27 into the collecting basin and thence into the waste pipe 32.

In Figs. 7 and 8 the inner casing is designated 1 and the outer casing 34, both casings being supported on a spider 35, and in Fig. 7, with an extended bracket 36 on each side working up and down in the slot 37 in the supporting straps or hangers 14. 38 is a fan, propelled by a motor 38', and 39 is an eye bolt in the top of the motor to engage a hook 40 for supporting the fan in the spider with the inner and outer casings. 8 is the spray head, and in this case provided with a bottom inlet 41. 7 is the water supply pipe connected to the combined fitting 7', the chamber 42 of which connects with the waste water outlet 32, the water inlet 43, and the strainer 44. The upper basin is supported above the collecting basin, all as heretofore shown in single casing type of humidifiers. The outer casing 34 rests on an outward flaring flanged portion 45, which in turn rests on extensions 46 of the spacing members 26.

Referring again to Fig. 2 the strainer is designated 44. 47 is a plug for inserting and removing the strainer when desired. 48 and 49 are plug cocks. It is obvious that water entering through the pipe 7 will pass through the plug cock 48 thence into the chamber 50 thence around and back through the strainer 44 into the chamber 51, thence through the plug cock 49 and into the spray head 8. For cleaning purposes it is also obvious that by turning the plug cock 48 to cut the water out of the chamber 50 and to turn it into the chamber 51, it will from there pass in a reverse direction through the strainer 44 and out into the chamber 50 when by turning the plug cock 49 in either direction the water passes into the annular umbrella like shaped opening 53, from whence it will issue in a conical sheet with great force projecting itself against the sides of the casing and thereby washing down the walls and causing a general flushing out of the humidifier.

In Fig. 6 the operation is exactly the same, except that when the water is flowing in both the normal and reversed directions it issues out through the pipe 7, going through the nozzle 8 when the apparatus is in operation, but issuing in a solid stream when the nozzle 8 is unscrewed and the flow of water reversed for cleaning the strainer. It will be noticed that a single plug cock 62 is substituted here for the two plug cocks 48 and 49; also that the strainer 44 is combined with the outlet plug 47, the necessary water passages 47' being cut therein.

The fitting 7' is fixed by bolts 54 to the casing 1. In Figs. 7 and 8, as already stated, the fitting 7' is a combined waste water outlet and water inlet with strainer. The operation of this combination, however, is exactly the same as the others except that the wash water from the strainer through the two-way plug cock 48 instead of issuing in the conical opening 53, issues through a down discharge outlet 55 directly into chamber 42 thence into the waste pipe 32. In the nozzle 8, the modification is rendered necessary by the use of this combined fitting, this modification taking the form of a bottom inlet 56 of the nozzle. The water is conducted upward through the arms 57 to the aperture 58, from whence it issues in the form of spray.

59 is a cleaning plug of the nozzle with an extended top 60 which fits into the hole 61 of the supporting spider 35, thereby centering the nozzle with reference to the casing 1.

While all these features above described, taken together, constitute my improvements in the construction of humidifiers with special reference to cleanliness and immunity from stoppages on account of lack of cleanliness, and whereas each one of the features really supplements the others, it is obvious that many modifications of construction may be made without departing from the spirit of my invention.

Having thus fully described my invention, what I claim is—

1. In a humidifier, a casing, means for supplying spray to the casing, means for collecting water from the inside of the wall of the casing and conducting the water laterally outside the casing, and means for collecting surplus water.

2. A humidifier comprising a casing, means for supplying spray to the casing; a receptacle adjacent to the discharge end of the casing for collecting and conducting water from the interior to the exterior of the casing, a passage between said casing and said receptacle, and a receptacle for collecting surplus water.

3. In a humidifier, a casing, means for supplying spray to the casing, means for collecting water, consisting of an upper receptacle below the casing for collecting water which runs down the wall of the casing and conducting the water laterally outside the casing, and a lower receptacle connected to the upper receptacle, conducting outlets in the upper receptacle outside and beyond the wall of the casing, and discharge passages between the casing and said upper receptacle.

4. In a humidifier, a casing, means for supplying spray to the casing, means for collecting water, consisting of an upper receptacle adjacent to the discharge end of the casing but separate therefrom and extending inside and outside the casing, and a receptacle adjacent to the first receptacle and connected thereto, lateral discharge passages between the casing and said first receptacle, and an annular discharge passage between said receptacles.

5. A humidifier comprising a casing, means for supplying spray to the casing, a receptacle adjacent to the discharge end of the casing provided with opposite inclined walls, one of which walls is inside, and the other outside the casing, one of the walls having discharge openings therein, an air passage between said casing and said receptacle, a receptacle for collecting surplus water, and an annular discharge passage between said receptacles.

6. In a humidifier, a casing, means for supplying spray to the casing, a receptacle below and adjacent to the casing provided with oppositely inclined walls, one of which deflects the spray outward and the other collects the water and the impurities commingled therewith outside the wall of the casing, discharge openings in the wall of the receptacle, discharge openings between the casing and said receptacle, and means for collecting surplus water.

7. In a humidifier, a casing, means for supplying spray and air to the casing, outlets arranged one above the other for the air to issue radially, means for directing the air issuing from the upper outlet through the drip water from the wall of the casing, means for preventing said drip water coming in contact with the air issuing from the lower outlet, and means for collecting surplus water.

8. A humidifier comprising a casing, means for supplying spray and inducing a current of air through the casing, a receptacle adjacent to the discharge end of the casing for collecting water from the interior of the casing and conducting it therefrom, said casing being concentrically supported above said receptacle, a passage between the casing and the receptacle for the lateral discharge of air from the interior of the casing, a receptacle for collecting surplus water, and an annular discharge passage between said receptacles.

9. A humidifier comprising a casing, means for supplying spray to the casing, means below the casing for directing air, water and solid matter laterally from the casing, means outside the casing for collecting the solid matter and separating it from the water, and means for collecting surplus water.

10. A humidifier comprising a casing, a spray head, means for supplying water to the spray head, means for collecting the water that runs down the walls of the casing, means for conducting said water laterally to an exterior surface whereon the lint and other impurities that are washed from the induced current of air may settle and separate themselves from the water and be readily wiped off, and means for collecting the surplus water.

11. A humidifier comprising a casing, means for supplying spray to the casing, an upper annular basin extending beyond the casing, a lower basin connected to the upper basin, means for conducting water from the upper to the lower basin, a deflecting cone in said lower basin, and a waste water pipe.

12. A humidifier comprising a casing, means for supplying spray to the casing, an annular receptacle below and extending into and beyond the casing, a passage between the casing and said receptacle, and a receptacle for collecting surplus water.

13. A humidifier comprising a casing, means for supplying spray to the casing, an annular receptacle below, separate from and extending inside and outside the casing, a passage between the casing and said receptacle, a deflector having means on its lower surface for directing water toward its transverse center, and a receptacle for collecting surplus water.

14. A humidifier comprising a casing, means for supplying spray to the casing, a receptacle below the casing for collecting water from the wall thereof, a receptacle for collecting surplus water, openings in the first receptacle for the discharge of water, and passages between said receptacles whose walls are closed at their inner ends.

15. A humidifier comprising a vertically adjustable casing, means for supplying spray to the casing, a receptacle for collecting water from the inside of the wall of the casing and conducting it outside thereof, a receptacle for collecting surplus water, means for conducting water from the first named receptacle to the latter receptacle, and a movable deflector.

16. A humidifier comprising a vertically adjustable casing, a supply pipe provided with means for producing spray, a receptacle for collecting water from the wall of the casing and on which receptacle the casing is detachably supported, a receptacle for collecting surplus water, and a movable deflector.

17. A humidifier comprising a vertically movable casing, means for supplying spray to the casing, a fixed receptacle separate from and below the casing for collecting water which runs down the wall of the casing, and means for collecting surplus water.

18. A humidifier comprising inner and outer vertically movable casings, concentrically arranged air and spray chambers surrounded by said casings, means for supplying spray to the inner casing, means for supplying air to the outer casing, means for mixing the air and spray and for directing the same radially outward, and means for collecting surplus water.

19. A humidifier comprising a vertically movable casing, a fan, a spray head, means for supplying water to the spray head, means for driving the fan, a lateral exit for the commingled air and spray, a receptacle for collecting surplus water, and means outside the casing for supporting said receptacle.

20. A humidifier comprising a vertically movable casing, means for supplying spray to the casing, a receptacle below the casing for collecting water from the wall thereof and conducting it outside the casing, a basin for collecting surplus water, means outside the casing for supporting the basin, and means for supporting the casing detachably above said basin.

21. A humidifier comprising inner and outer vertically movable casings, concentrically arranged air and spray chambers surrounded by said casings, a fan, a spray head, means for supplying power to the fan, means for supplying fluid to the spray head, an inclined exit for the air and spray, and means for collecting surplus water.

22. A humidifier comprising a vertically movable casing, a spray head, a combined water supply inlet and waste water outlet provided with a strainer, means for directing the water supply normally through the strainer, means for reversing the flow of water through said strainer, means for collecting the surplus water, and means for discharging wash water from the strainer into said collecting means.

23. A humidifier comprising a casing, a combined water supply inlet and waste water outlet provided with a strainer, a spray head, a pipe connection from said water supply inlet to said spray head, and means for collecting surplus water and returning it to the waste water outlet.

24. A humidifier comprising an inner and an outer casing, a water supply inlet provided with a strainer, a waste water outlet, a fan, a spray head, means for supplying power to the fan, means for supplying water to the spray head through the strainer, means for reversing the flow of water through the strainer, and means for discharging wash water from the strainer into a suitable receptacle.

25. A humidifier comprising a vertically movable casing, means for supporting the casing in elevated position; a spray head discharging downward, a waste water outlet, and a water inlet provided with a strainer, means for supplying water to the spray head normally through the strainer, means for reversing the direction of the flow of the water through the strainer, and means for collecting wash water, a vertically movable deflecting cone, a fixed and permanently supported member comprising a lower collecting basin and an upper basin extending inward and outward below the lower edge of said vertically movable casing, an air and water space between said upper basin and said vertically movable basin, means for conducting water from the upper basin to said collecting basin, an annular discharge opening between said basins, and means for discharging the collected surplus water.

26. A humidifier comprising vertically movable inner and outer casings, a fan, means for supplying power to the fan, and means for supporting in elevated position the casings and fan, a spray head discharging downward, a water inlet and waste water outlet provided with a strainer, means for supplying water to the spray head normally through the strainer, means for reversing the direction of the flow of the water through the strainer, and means for conducting wash water into the waste water receptacle; a vertically movable deflecting cone; a fixed and permanently supported member comprising a lower collecting basin, an upper basin extending inward and outward below the lower edge of said vertically movable inner casing, a deflecting surface above the upper edge of which is supported said vertically movable outer casing; a discharge passage between the lower basin and the upper basin, a like passage between the upper basin and said deflecting surface, and both combining into one near the point of discharge; and means for discharging surplus water collected by the two basins into the waste water outlet.

In testimony whereof I affix my signature, in presence of two witnesses.

STUART W. CRAMER.

Witnesses:
 Wm. B. Hodge,
 Jno. C. Watson.